Patented Mar. 22, 1932

1,850,099

UNITED STATES PATENT OFFICE

KARL FRIEDRICH AND CURT FRIEDRICH, OF BRESLAU, GERMANY

PROCESS OF PRODUCING ARTICLES COVERED BY COLD PROCESS WITH A GLAZE-LIKE COATING

No Drawing. Application filed April 13, 1928. Serial No. 269,862.

This invention relates to a process of producing articles covered, by cold process, with a glazing-like coating. The essential constituent of the liquids which up to the present have been used for glazing by cold process consists of finely ground cement admixed with water. The liquid glazing, produced by squirting the pure, thin cement-paste onto mineral-articles, disappears generally at the setting and hardening process, unless special measures be taken for preserving it. These special measures consist either in leaving the articles during the setting in a moist atmosphere or in immersing it in water, or in adding to the glazing-liquid substances adapted to increase the colloidal property of the same, so that the painted-on glazing-mass solidifies as gel-layer free from pores and bright. The first mentioned process presents the inconvenience of a great quantity of moistness, and it is also very unreliable as one has to count with a high percentage of waste. In the second mentioned process the solidity and hardness of the glazing is unfavorably influenced by the compartively large addition of substances foreign to the cement.

All the glazings, produced according to the known process, have the defect that they are not very resistant against chemical influences and liable to be more or less destroyed by acids or by acid-vapours and gases. Owing to this defect their applicability is rather limited so that they can only partly serve as substitutes for the real fire-glazed articles.

According to the invention these inconveniences can be avoided almost completely in partly using the known process but carrying the same out in a peculiar manner in combination with an absolutely novel method designed to suppress the sensitiveness against acid.

The process consists in making the articles to be glazed from porous materials, capable to readily absorb and retain large quantities of water, in adding to the glazing liquid only quite little quantities of substances increasing their colloidal property, and in finally applying on the articles which have completely set a quite thin coating of solutions of nitro-cellulose or ether-cellulose.

As porous substances pumice-stone or similar volcanic products may be used for example, or slags chilled in water, which in suitable grain-size are stirred together with cement or water to form a plastic mass from which the articles to be glazed are made. As suitable mass for the moulding cellular concrete may be used which has been produced by stirring cement with frothy liquids or with substances generating water-gas. The porous articles retain during the setting the moistness a sufficiently long time so that it is not necessary to specially keep moist the surrounding atmosphere in the setting space.

As substances improving the colloidal property of the glazing liquid metal-salts, specially zinc-soaps, are adapted, quite little quantities of the same being added to the glazing liquid.

For obtaining the acid-proofness, solutions of nitrocellulose or ether-cellulose with addition of resins, artificial resins or the like, in volatile organic solvents, as alcohol ether, acetone, or the like, are preferably used.

The addition of resins and artificial resins is necessary in order to a obtain a good adhering property of the coating on the support, this being not obtained by solutions of pure nitrocellulose. It is further advisable to add a little quantity of softening means as esters possessing a high boiling point for example triphenylphosphate or the like to further increase the adhering property and to reduce at the same time the brittleness of the pure nitrocellulose. The thin cellulose coating which, owing to its extraordinary thinness and transparency is not visible from the outer side, may be applied on the articles by dipping, painting with brushes, spraying or in any other convenient manner.

The cellulose-coating presents the further advantage that it closes pores, hair-fine cracks or the like which might exist in the glazing, whereby the glazing becomes for the most purposes equal to a fire-glazing, i. e. water repulsing.

When colored glazings have to be produced, one proceeds in the same manner in blowing on, however after applying the first glazing free from coloring substances, a similarly composed glazing liquid in a quite thin layer, which contains the coloring substance. The coloring substance has hitherto been added to the whole quantity of glazing liquid, so that the consumption of expensive coloring substances was very high and the resistance and hardness of the finished glazing was considerably impaired by the high percentage of foreign substances.

The new glazings are washable like fire-glazings so that stains of pencil, ink, blood or the like can be easily removed.

We claim:

A process for providing articles with a glaze like layer by cold process in which the glazing layer composed chiefly of cement mortar is maintained in moist condition until set, consisting in making the filling bodies for the articles to be coated, made of a mass composed of filling bodies, setting substances and water, of highly porous substances such as granulated slags which absorb water like a sponge and retain it for a long time.

In testimony whereof we affix our signatures.

KARL FRIEDRICH.
Dr. CURT FRIEDRICH.